United States Patent
Fleischman et al.

(10) Patent No.: US 8,671,288 B2
(45) Date of Patent: Mar. 11, 2014

(54) PROCESSOR WITH POWER CONTROL VIA INSTRUCTION ISSUANCE

(75) Inventors: Jay Fleischman, Ft. Collins, CO (US); Michael Estlick, Ft. Collins, CO (US); Kevin Hurd, Ft. Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 317 days.

(21) Appl. No.: 12/974,799

(22) Filed: Dec. 21, 2010

(65) Prior Publication Data

US 2012/0159225 A1    Jun. 21, 2012

(51) Int. Cl.
*G06F 1/32*    (2006.01)

(52) U.S. Cl.
USPC ........... 713/300; 713/310; 713/320; 713/321; 713/322; 713/323; 713/324; 713/330; 713/340

(58) Field of Classification Search
USPC ................ 713/300, 310, 320–324, 330, 340
See application file for complete search history.

(56) References Cited

U.S. PATENT DOCUMENTS

| | | | | |
|---|---|---|---|---|
| 6,775,787 | B2* | 8/2004 | Greene | 713/340 |
| 7,681,054 | B2* | 3/2010 | Ghiasi et al. | 713/320 |
| 7,992,017 | B2* | 8/2011 | Safford et al. | 713/320 |
| 2003/0126476 | A1* | 7/2003 | Greene | 713/300 |
| 2009/0070607 | A1* | 3/2009 | Safford et al. | 713/320 |

* cited by examiner

*Primary Examiner* — M Elamin

(57) ABSTRACT

Methods and apparatuses are provided for controlling power consumption in a processor (or computational unit thereof). The method comprises monitoring power consumption in a processor (or computational unit) and determining that the power consumption of the processor (or computational unit) exceeds a threshold. Thereafter, instruction issuance if modified (such as by slowing or ceasing instruction issuance) within the processor (or computational unit) until the power consumption is below the threshold. The apparatus comprises a power consumption monitor for determining when power consumption within the processor exceeds a threshold. Upon that determination, a scheduler begins modify instruction issuance to one or more execution units until the power consumption is below the threshold. The modification of instruction issuance can be to slow instruction issuance or cease instruction issuance for a time period or until the power consumption is below the threshold.

16 Claims, 4 Drawing Sheets

PROCESSOR WITH POWER CONTROL VIA INSTRUCTION ISSUANCE

FIELD OF THE INVENTION

The present invention relates to the field of information or data processor architecture. More specifically, this invention relates to the field of implementing a computational or mathematical unit in a processor achieving power control via varying instruction issuance.

BACKGROUND

Information or data processors are found in many contemporary electronic devices such as, for example, personal computers, personal digital assistants, game playing devices, video equipment and cellular phones. Processors used in today's most popular products are known as hardware as they comprise one or more integrated circuits. Processors execute software to implement various functions in any processor based device. Generally, software is written in a form known as source code that is compiled (by a complier) into object code. Object code within a processor is implemented to achieve a defined set of assembly language instructions that are executed by the processor using the processor's instruction set. An instruction set defines instructions that a processor can execute. Instructions include arithmetic instructions (e.g., add and subtract), logic instructions (e.g., AND, OR, and NOT instructions), and data instructions (e.g., move, input, output, load, and store instructions). As is known, computers with different architectures can share a common instruction set. For example, processors from different manufacturers may implement nearly identical versions of an instruction set (e.g., an x86 instruction set), but have substantially different architectural designs.

Within a processor, numerical data is typically expressed using integer or floating-point representation. Mathematical computations within a processor are generally performed in computational units designed for maximum efficiency for each computation. Thus, it is common for a processor architecture to have an integer computational unit and a floating-point computational unit. As the use of graphic processing and scientific computing has expanded, the use of a processor's integer and floating-point mathematical capabilities has been increasing. Other factors, such as use for audio processing, are also contributing to an increased use of a processor's mathematical capabilities. To accommodate these and other needs, and to meet the ever growing demand for increased integer and floating-point performance, the computational capability of processors is continually evolving.

When performing operations, including integer or floating-point computations, power virus code may occasionally cause the processor (or an operational unit) to consume more power than normal. Generally, power virus code comprises instructions that don't have any practical use; the code simply causes wasted power and operational cycles within the processor. Examples include code that causes unnecessary register-to-register data moves, operand reordering for commutative equations (e.g., addition or multiplication) or wait or no-op (no operation) instructions. In addition to wasting power and operational cycles, power virus code can cause the internal operating temperature of the processor to rise beyond specified performance parameters. Typically, an over-temperature condition causes a reset event to occur and the entire processor stops and is reset in accordance with a reset protocol.

BRIEF SUMMARY OF EMBODIMENTS OF THE INVENTION

An apparatus is provided for modifying instruction issuance in a processor (or computational unit thereof) in response to power consumption exceeding a threshold. The apparatus comprises a decoder for decoding instructions to be performed and a power consumption monitor for determining when power consumption within the processor exceeds a threshold. Upon that determination, a scheduler begins modify instruction issuance to one or more execution units until the power consumption is below the threshold. The modification of instruction issuance can be to slow instruction issuance or cease instruction issuance for a time period or until the power consumption is below the threshold.

In another embodiment, an apparatus is provided for modifying instruction issuance in a processor (or computational unit thereof) in response to power consumption exceeding a threshold for a particular instruction. The apparatus comprises a decoder for decoding instructions to be performed and providing a threshold to a power consumption monitor for that instruction. When the power consumption within the processor exceeds a threshold for the particular instruction, a scheduler begins modify issuance of the particular instruction to execution units until the power consumption is below the threshold. The modification of instruction issuance can be to slow issuance of the particular instruction or cease issuance of the particular instruction for a time period or until the power consumption is below the threshold.

In yet another embodiment, an apparatus is provided for modifying instruction issuance in a processor (or computational unit thereof) in response to power consumption exceeding a threshold. The apparatus comprises a detector capable of determining that an energy event has occurred and a decoder for decoding instructions to be performed. A power consumption monitor determines when power consumption within the processor exceeds a threshold, which can be modified responsive to the detector identifying the occurrence of the energy event (for example, a battery powered device being "unplugged"). When power consumption exceeds the threshold, a scheduler begins modify instruction issuance to one or more execution units until the power consumption is below the threshold. The modification of instruction issuance can be to slow instruction issuance or cease instruction issuance for a time period or until the power consumption is below the threshold.

A method is provided for controlling power consumption in a processor (or computational unit thereof). The method comprises monitoring power consumption in a processor (or computational unit) and determining that the power consumption of the processor (or computational unit) exceeds a threshold. Thereafter, instruction issuance if modified (such as by slowing or ceasing instruction issuance) within the processor (or computational unit) until the power consumption is below the threshold.

In another embodiment, a method is provided for controlling power consumption in a processor (or computational unit thereof). The method comprises monitoring power consumption in a processor (or computational unit) and determining that the power consumption of the processor (or computational unit) exceeds a threshold. Thereafter, instruction issuance if modified (such as by slowing or ceasing instruction issuance) within the processor (or computational unit) until the power consumption is below the threshold.

In yet another embodiment, a method is provided for controlling power consumption in a processor (or computational unit thereof). The method comprises monitoring power consumption in a processor (or computational unit) and determining that the power consumption of the processor (or computational unit) exceeds a threshold that varies upon detecting an occurrence of an energy changing event (such as a battery powered device being "unplugged"). Thereafter, instruction issuance if modified (such as by slowing or ceasing instruction issuance) within the processor (or computational unit) until the power consumption is below the threshold.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Moreover, as used herein, the word "processor" encompasses any type of information or data processor, including, without limitation, Internet access processors, Intranet access processors, personal data processors, military data processors, financial data processors, navigational processors, voice processors, music processors, video processors or any multimedia processors. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, the following detailed description or for any particular processor microarchitecture.

Figure 1:
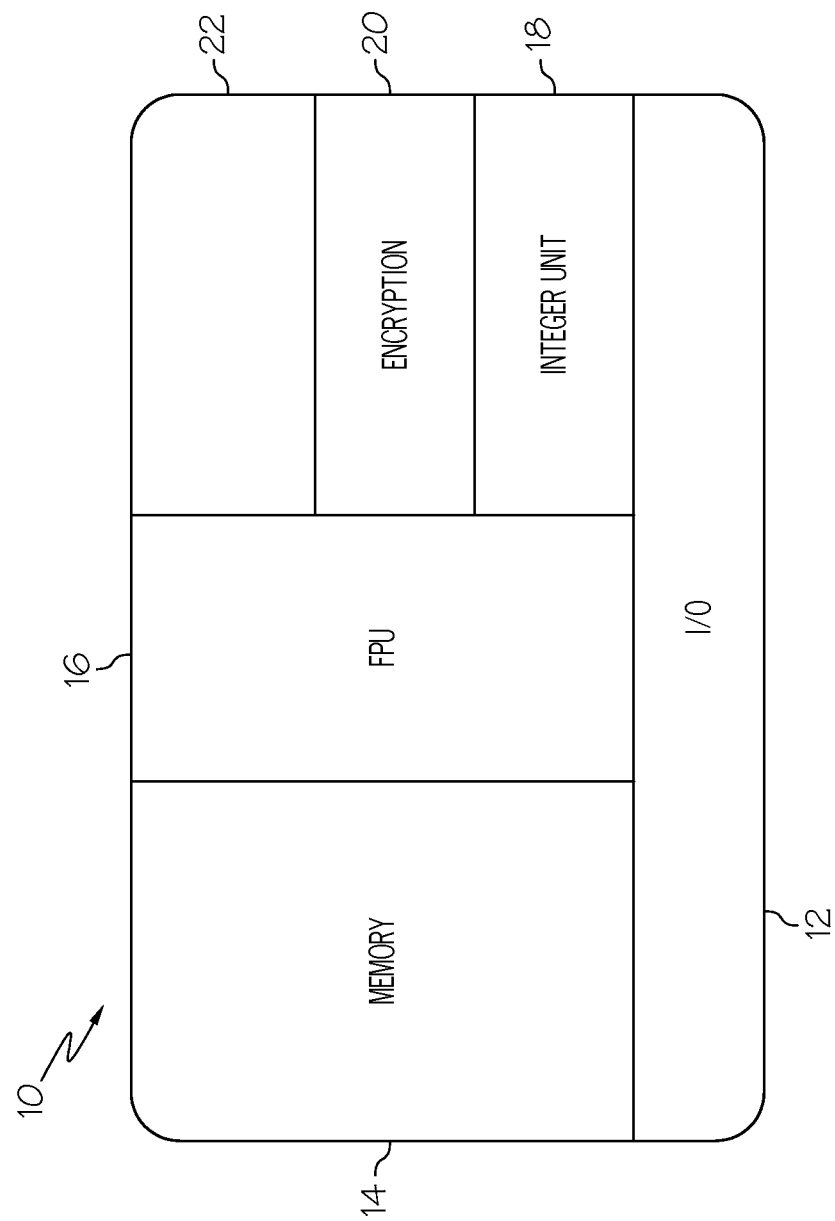
FIG. 1 is a simplified exemplary block diagram of processor suitable for use with the embodiments of the present disclosure.

Referring now to FIG. 1, a simplified exemplary block diagram is shown illustrating a processor 10 suitable for use with the embodiments of the present disclosure. In some embodiments, the processor 10 would be realized as a single core in a large-scale integrated circuit (LSIC). In other embodiments, the processor 10 could be one of a dual or multiple core LSIC to provide additional functionality in a single LSIC package. As is typical, processor 10 includes an input/output (I/O) section 12 and a memory section 14. The memory 14 can be any type of suitable memory. This would include the various types of dynamic random access memory (DRAM) such as SDRAM, the various types of static RAM (SRAM), and the various types of non-volatile memory (PROM, EPROM, and flash). In certain embodiments, additional memory (not shown) "off chip" of the processor 10 can be accessed via the I/O section 12. The processor 10 may also include a floating-point unit (FPU) 16 that performs the float-point computations of the processor 10 and an integer processing unit 18 for performing integer computations. Additionally, an encryption unit 20 and various other types of units (generally 22) as desired for any particular processor microarchitecture may be included.

Figure 2:
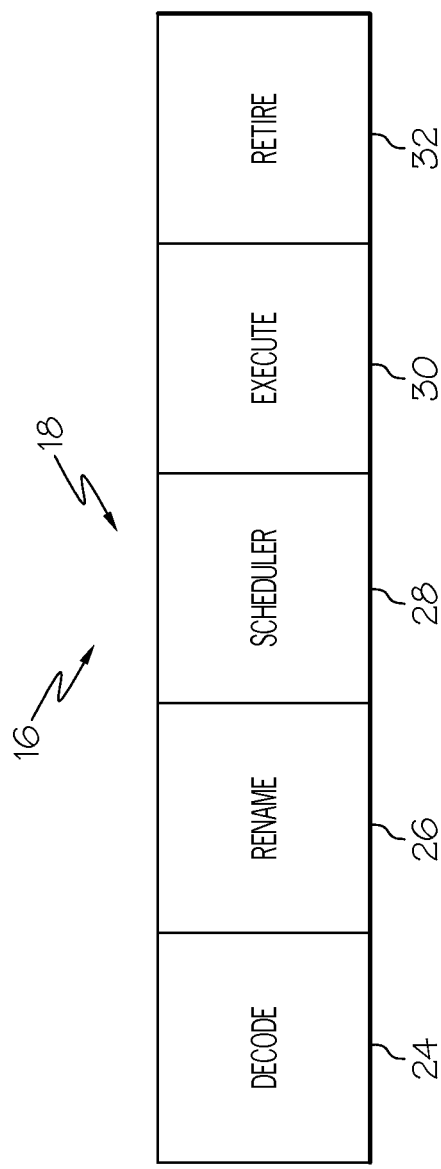
FIG. 2 is a simplified exemplary block diagram of floating-point unit or integer unit suitable for use with the processor of FIG. 1.

Referring now to FIG. 2, a simplified exemplary block diagram of a computational unit suitable for use with the processor 10. In one embodiment, FIG. 2 could operate as the floating-point unit 16, while in other embodiments FIG. 2 could illustrate the integer unit 18.

In operation, the decode unit 24 decodes the incoming operation-codes (opcodes) dispatched (or fetched by) a computational unit. The decode unit 24 is responsible for the general decoding of instructions (e.g., x86 instructions and extensions thereof) and how the delivered opcodes may change from the instruction. The decode unit 24 will also pass on physical register numbers (PRNs) from an available list of PRNs (often referred to as the Free List (FL)) to the rename unit 26.

The rename unit 26 maps logical register numbers (LRNs) to the physical register numbers (PRNs) prior to scheduling and execution. According to various embodiments of the present disclosure, the rename unit 26 can be utilized to rename or remap logical registers in a manner that eliminates the need to actually store known data values in a physical register. This saves operational cycles and power, as well as decrease latency.

The scheduler 28 contains a scheduler queue and associated issue logic. As its name implies, the scheduler 28 is responsible for determining which opcodes are passed to execution units and in what order. In one embodiment, the scheduler 28 accepts renamed opcodes from rename unit 26 and stores them in the scheduler 28 until they are eligible to be selected by the scheduler to issue to one of the execution pipes.

The execute unit(s) 30 may be embodied as any generation purpose or specialized execution architecture as desired for a particular processor. In one embodiment the execution unit may be realized as a single instruction multiple data (SIMD) arithmetic logic unit (ALU). In other embodiments, dual or multiple SIMD ALUs could be employed for super-scalar and/or multi-threaded embodiments, which operate to produce results and any exception bits generated during execution.

In one embodiment, after an opcode has been executed, the instruction can be retired so that the state of the floating-point unit 16 or integer unit 18 can be updated with a self-consistent, non-speculative architected state consistent with the serial execution of the program. The retire unit 32 maintains an in-order list of all opcodes in process in the floating-point unit 16 (or integer unit 18 as the case may be) that have passed the rename 26 stage and have not yet been committed by to the architectural state. The retire unit 32 is responsible for committing all the floating-point unit 16 or integer unit 18 architectural states upon retirement of an opcode.

Figure 3:
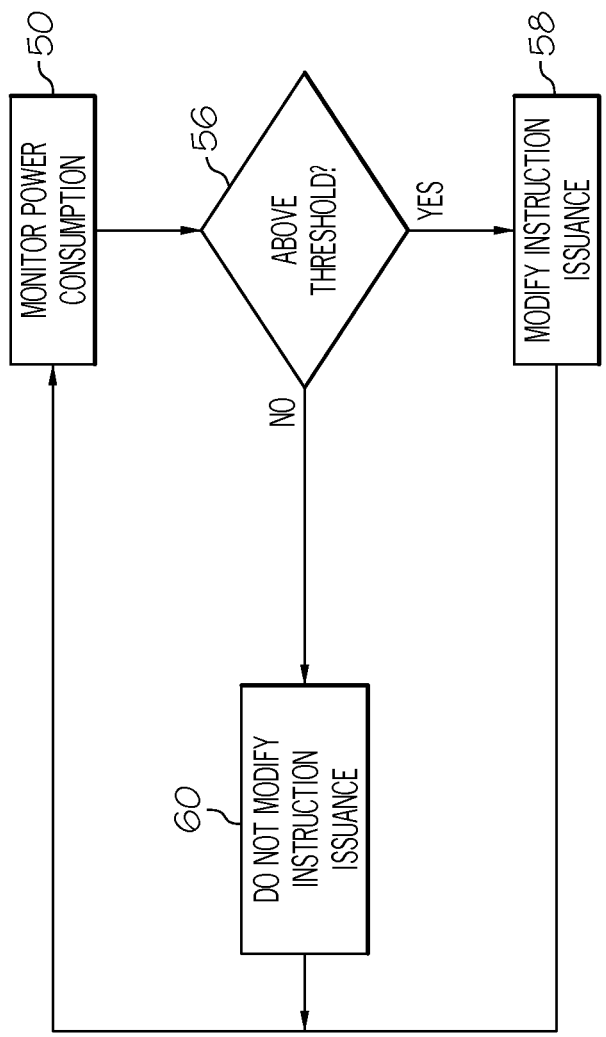
FIG. 3 is a flow diagram illustrating an embodiment of the present disclosure.

Referring now to FIG. 3, a flow diagram is shown illustrating the steps followed by an embodiment of the present disclosure for the processor 10, the floating-point unit 16, the integer unit 18 or any other unit 22 of the processor 10. The method begins in step 50 where power consumption of the processor (or any operational unit thereof) is monitored. In one embodiment of the present disclosure, average power is monitored over several operational cycles, for example, in a sigma-delta based accumulator. In other embodiments, an instantaneous power measurement could be used. In still other embodiments power consumption by instruction (or instruction type) could be stored in a table providing an expected power consumption for an instruction when it is decoded (for example, in decoder 24 of FIG. 2).

Next, decision 56 compares the measured or monitored power consumption to a threshold. In one embodiment of the present disclosure, the threshold is a fixed value that is set according to a thermal design point or other parameters of the processor (or operational unit). For example, the threshold could be set to just above the highest power for a known "real" opcode and defining any greater power consumption as a "power virus". In other embodiments, the threshold is variable upon detection of an occurrence or event (see FIG. 4 below). In still other embodiments, the threshold varies by instruction (or instruction type) responsive to an expected power consumption following decoding of an instruction. In any embodiment, one object of the present disclosure is to avoid overheating the processor or putting too much load on the power supply.

If the determination of decision 56 is that the monitored power consumption is above the threshold, step 58 begins to modify instruction issuance to the execution units. In one embodiment, the scheduler (28 of FIG. 2) slows release of instructions to the execution units (30 in FIG. 2) thereby reducing power consumption. In other cases, the scheduler may cease issuing instructions for a time period or until the monitored power consumption returns to a level below the threshold (as determined by decision 56). In still other embodiments, the scheduler may slow or stop issuance of particular instructions determined to be wasteful of power upon execution. In any event, the present disclosure contemplates that power consumption may be controlled in the processor (or any operational unit thereof) by modifying instruction release to execution units to reduce power consumption or to maintain power consumption within certain operational parameters.

Conversely, if the determination of decision 56 is that the monitored power consumption is not above the threshold, does not modify instruction issuance (step 60) and the method returns to step 50 and the process repeats.

Figure 4:
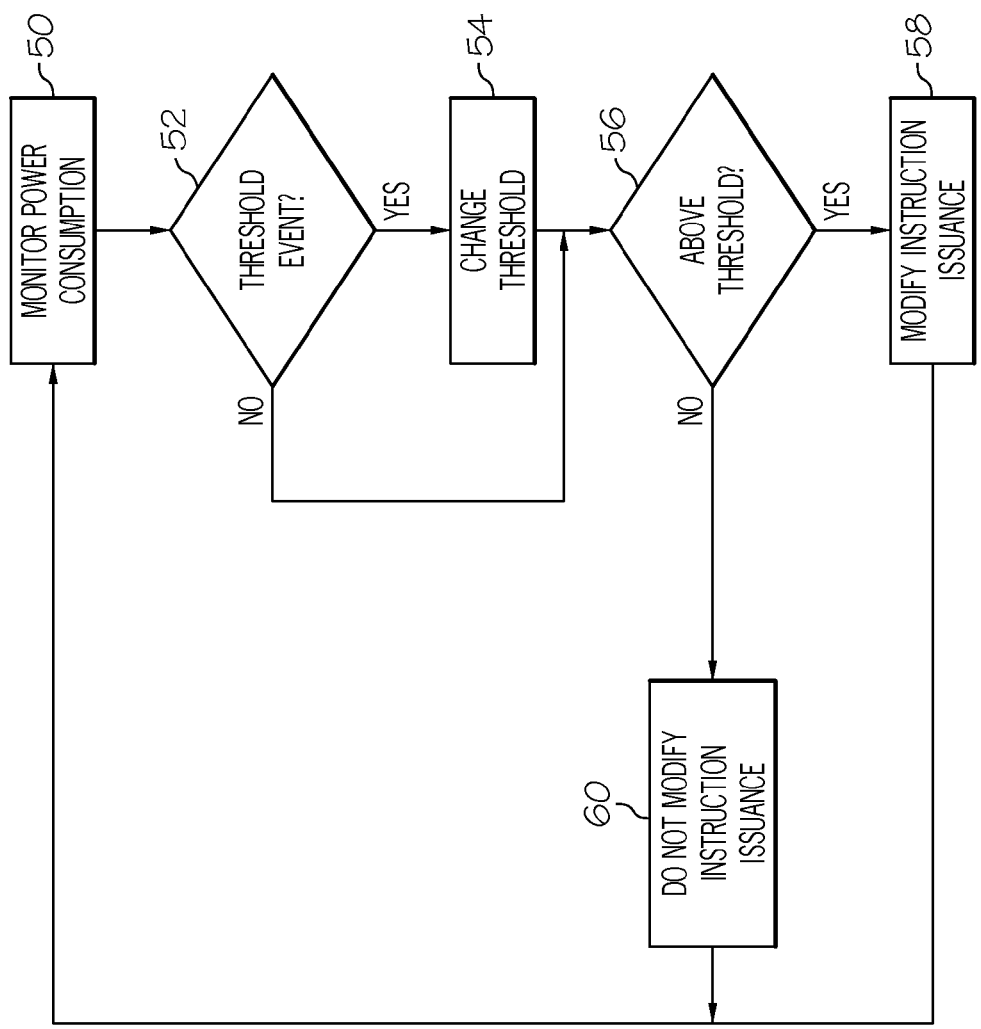
FIG. 4 is a flow diagram illustrating another embodiment of the present disclosure.

Referring now to FIG. 4, a flow diagram is shown illustrating the steps followed by another embodiment of the present disclosure for the processor 10, the floating-point unit 16, the integer unit 18 or any other unit 22 of the processor 10. As with FIG. 3, the method begins in step 50 where power consumption of the processor (or any operational unit thereof) is monitored. In one embodiment of the present disclosure, average power is monitored over several operational cycles, for example, in a sigma-delta based accumulator. In other embodiments, an instantaneous power measurement could be used. In still other embodiments power consumption by instruction (or instruction type) could be stored in a table providing an expected power consumption for an instruction when it is decoded (for example, in decoder 24 of FIG. 2).

The method proceeds to decision 52 where it is determined whether a threshold changing event has occurred. According to the present disclosure, a threshold changing event comprises some change indicating that the threshold should be increased or reduced for power consumption purposes. For example, a laptop computer (such as shown in FIG. 5A), may operate from line current or from an internal battery. While "plugged in", one threshold may be set to allow more instructions to be issued than when, for example, it is detected that the device has been "un-plugged" and is operating on battery power. Upon detection of such an event (decision 52), the threshold could be reduced (step 54), thus slowing the issuance of instructions (from scheduler 28 in FIG. 2) to execution units (30 in FIG. 2) to conserve power consumption. When returned to a line current source, the threshold could be returned or adjust to the former threshold level (again step 54).

Conversely, if the determination of decision 52 is that a threshold changing event has not occurred, the method proceeds to decision 56, which compares the measured or monitored power consumption to a threshold (which may or may not have been modified in step 54). If the determination of decision 56 is that the monitored power consumption is not above the threshold, instruction issuance is not modified (step 60) and the routine begins again at step 50.

Conversely, if the determination of decision 56 is that the monitored power consumption is above the threshold, step 58 begins to modify instruction issuance to the execution units. In one embodiment, the scheduler (28 of FIG. 2) slows release of instructions to the execution units (30 in FIG. 2) thereby reducing power consumption. In other cases, the scheduler may cease issuing instructions for a time period or until the monitored power consumption returns to a level below the threshold (via looping back through the routine of FIG. 4). In still other embodiments, the scheduler may slow or stop issuance of particular instructions determined to be wasteful of power upon execution. In any event, the present disclosure contemplates that power consumption may be controlled in the processor (or any operational unit thereof) by modifying instruction release to execution units to reduce power consumption or to maintain power consumption within certain operational parameters.

Various processor-based devices that may advantageously use the processor (or any computational unit) of the present disclosure include, but are not limited to, laptop computers, digital books or readers, printers, scanners, standard or high-definition televisions or monitors and standard or high-definition set-top boxes for satellite or cable programming reception. In each example, any other circuitry necessary for the implementation of the processor-based device would be added by the respective manufacturer. The above listing of processor-based devices is merely exemplary and not intended to be a limitation on the number or types of processor-based devices that may advantageously use the processor (or any computational) unit of the present disclosure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for controlling power consumption by a processor executing instructions, comprising:
   ceasing issuance, by the processor, of a particular instruction to an operational unit of the processor for a period of time responsive to a monitored power consumption of the operational unit exceeding a threshold; and
   the processor modifying the threshold responsive to detecting use by the processor of a battery power supply.

2. The method of claim 1, further comprising slowing issuance of other instructions within the operational unit until the power consumption of the operational unit is below the threshold.

3. The method of claim 1, further comprising ceasing issuance of other instructions within the operational unit until the power consumption of the computational unit is below the threshold.

4. The method of claim 1, further comprising ceasing issuance of all instructions within the operational unit for a period of time.

5. The method of claim 1, further comprising modifying the threshold responsive to detecting an occurrence of an event.

6. A method for controlling power consumption by a processor executing instructions, comprising:
   the processor decoding an instruction and providing a power consumption threshold for the instruction; and
   the processor modifying instruction issuance to an operational unit of the processor responsive to a comparison of the power consumption threshold to a monitored power consumption of the operational unit; and
   the processor modifying the power consumption threshold for the operational unit responsive to detecting use by the processor of a battery power supply.

7. The method of claim 6, wherein modifying instruction issuance further comprises slowing issuance of instructions within the operational unit until the power consumption of the operational unit is below the threshold.

8. The method of claim 7, wherein modifying instruction issuance further comprises slowing issuance of other instructions within the operational unit until the power consumption of the operational unit is below the power consumption threshold.

9. The method of claim 6, wherein modifying instruction issuance further comprises ceasing issuance of instructions within the operational unit until the power consumption of the operational unit is below the threshold.

10. The method of claim 9, wherein modifying instruction issuance further comprises slowing issuance of other instructions within the operational unit until the power consumption of the operational unit is below the power consumption threshold.

11. The method of claim 10, wherein modifying instruction issuance further comprises ceasing issuance of other instructions within the operational unit until the power consumption of the operational unit is below the power consumption threshold.

12. The method of claim 6, wherein modifying instruction issuance further comprises ceasing issuance of the instruction within the operational unit for a period of time.

13. A processor, comprising:
   a power consumption monitor for determining when power consumption within the processor exceeds a threshold;
   a detector for adjusting the threshold responsive to detecting use by the processor of a battery power supply;
   a scheduler for issuing instructions for execution, the scheduler being responsive to a determination that the power consumption exceeds the threshold to cease instruction issuance for a period of time until the power consumption is below the threshold; and
   an execution unit for executing the instructions issued from the scheduler.

14. The processor of claim 13, further comprising a decoder for decoding instructions and for providing the threshold to the power consumption monitor responsive to a decoded instruction.

15. The processor of claim 13, wherein the detector also adjusts the threshold responsive to detecting an occurrence of an event.

16. A device comprising the processor of claim 13, the device comprising at least one of a group consisting of: a computer; a digital book; a printer; a scanner; a television; or a set-top box.

* * * * *